United States Patent [19]

Kimball

[11] 4,247,676

[45] Jan. 27, 1981

[54] STORABLE FLOWABLE POLYURETHANE ADHESIVE COMPOSITION

[75] Inventor: Michael E. Kimball, Ashland, Ohio

[73] Assignee: The Goodyear Tire & Rubber Company, Akron, Ohio

[21] Appl. No.: 66,153

[22] Filed: Aug. 13, 1979

[51] Int. Cl.³ .................. C08G 18/16; C08G 18/32
[52] U.S. Cl. ................................ 528/49; 428/480; 428/423.7; 156/331; 528/57; 528/64; 528/67; 528/76
[58] Field of Search ............ 528/64, 67, 76, 57, 528/48, 49

[56] References Cited

U.S. PATENT DOCUMENTS

| | | | |
|---|---|---|---|
| 3,703,426 | 11/1972 | Larson et al. | 156/308 |
| 3,876,604 | 4/1975 | Caruso et al. | 260/34.2 |
| 3,888,831 | 6/1975 | Kogon | 528/57 |
| 3,891,606 | 6/1975 | Kogon | 528/48 |
| 3,945,875 | 3/1976 | Jackson | 156/308 |
| 4,029,730 | 6/1977 | Schroeder | 528/59 |
| 4,075,150 | 2/1978 | Hoeschele | 260/33.2 R |
| 4,125,522 | 11/1978 | Becker | 528/76 |

*Primary Examiner*—H. S. Cockeram
*Attorney, Agent, or Firm*—J. D. Wolfe

[57] ABSTRACT

There are disclosed storable, flowable, liquid polyurethane compositions comprising an equivalent of a prepolymer formed by reacting a liquid material having 2 to 3 hydroxyls with sufficient organic polyisocyanate to give an excess of 3 to 15 percent free NCS in said prepolymer and from 0.85 to 1.15 equivalents of a complex of alkali metal salt with 4,4'-diphenylmethane diamine, said polyurethane compositions being useful as gel coats and adhesives.

10 Claims, No Drawings

STORABLE FLOWABLE POLYURETHANE ADHESIVE COMPOSITION

TECHNICAL FIELD

This invention relates to a storable, flowable polyurethane composition having relatively long shelf life at room temperature but readily cured at elevated temperatures to a solid composition. More particularly this invention relates to flowable compositions useful as gel coats and adhesives.

BACKGROUND ART

It is well known that polyurethane prepolymers are readily cured with alkali metal salt complexes of 4,4'-methylene dianiline type. The nature of these complexes and their processes of preparation and use are described in such U.S. Pat. Nos. as 3,755,261, 3,876,604 and 4,029,730 and generally may be expressed in the following manner.

The polyurethanes are generally formed by first reacting a polyether polyol or a polyester polyol with a molar excess of an organic diisocyanate to form a prepolymer having terminal isocyanato groups. The prepolymer is then cured to increase its molecular weight from less than about 3,000 to upwards of about 10,000. Examples of such polymers are described in U.S. Pat. Nos. 2,620,516, 2,777,831, 2,843,568, 2,866,774, 2,900,368, 2,929,800, 2,948,691, 2,948,707 and 3,114,735, herein incorporated by reference.

Prior to the curing operation itself, mixing and/or milling of the polyurethane with finely divided particles of the complex is required. Typically the complex particle size is 1 to 150 microns, preferably 2 to 20 microns. Grinding of the complex can be accomplished in standard grinding equipment such as the fluid energy mill and vertical hammer mills employing air classification to remove ground material from the mill.

Mixing of the finely divided complex with liquid prepolymers can be accomplished in dough mixers, high speed impeller mixers, paddle-type mixers and the like. For best results it is preferred that the mix found in the foregoing types of mixers be further mixed (or the complex dispersed) by use of a three-roll mill such as is used in paint and ink manufacture. Improved dispersions can also be prepared in colloid mills. These various types of mixers and mills are described in "The Encyclopedia of Chemical Process Equipment," W. J. Mead, Reinhold (1964).

In the use of a solid type polyurethane prepolymer or gum which is to be cured the complex may be dispersed on a rubber mill or in an internal mixer (a Banbury Mixer). Once the gum has been banded on the mill or broken down in the internal mixer the finely ground complex can be added directly and milling or mixing continued until a uniform dispersion has been prepared.

In mixing the complex with either fluid prepolymers or millable gums the temperature must be kept below the decomposition point of the complex in order to avoid the possibility of premature curing. In the present process the decomposition point of the complex is a function of the particular complex being used and the polymer in which the complex is dispersed. For isocyanato-terminated urethane prepolymers and the sodium chloride complex of methylene dianiline, mixing should be performed below 80° C. and preferably below about 50° C.

The temperature to be utilized during the curing of urethanes will be about 90°–180° C. Temperature is not particularly critical but it must be above the temperature at which the complex dissociates in the system being cured; this temperature will also vary with each particular complex. The complex between sodium chloride and 4,4'-methylenedianiline begins to dissociate at about 90° C. in a urethane system.

Full curing will ordinarily take about 1 minute to 24 hours depending on the temperature for urethanes when utilizing MDA/sodium chloride complex. Preferred curing conditions range from ½–12 hours at temperatures ranging from about 100°–150° C. At these preferred curing temperatures sufficient cure to permit demolding occurs within about 5 seconds to 5 minutes because of the high reactivity of the MDA.

DISCLOSURE AND PRACTICE OF THE INVENTION

Although the above described patents teach relatively fast cures, viz. a few minutes to hours, are obtained at elevated temperature there is no positive teaching of how to obtain flowable compositions having relatively long shelf life or stability at room conditions.

This invention provides a flowable composition having relatively long shelf life that can be coated on a substrate and quickly cured at elevated temperatures.

The nature and advantages of this invention can be more readily seen and appreciated by reference to the following representative examples where all parts and percentages are by weight unless otherwise indicated.

EXAMPLE 1

Twenty-four and six tenths equivalents of a copolymer of 50/50 mol percent ethylene glycol/tetramethylene ether glycol of 1000 molecular weight was heated to 100° C. under a vacuum for 30 minutes and then cooled to 27° C.

This degassed copolymer was reacted at a temperature of 50° C. under a vacuum with 12.3 equivalents of 2,4-toluene diisocyanate, 54.39 equivalents of a polymeric type of 4,4'-diphenyl methane diisocyanate having an isocyanate value slightly greater than 2.0 to about 2.9 to form a prepolymer. The prepolymer was immediately cooled to 27° C. It is preferred that the finished prepolymer contain between 7.8 and 8 percent by weight of free NCO.

To the above cooled prepolymer 43.28 equivalents of the sodium chloride complex of 4,4'-diphenyl methane diamine (du Pont's trademark material Caytur 22) was added slowly with rapid stirring to incorporate the complex and thus prevent it sitting on top of the prepolymer.

In a preferred embodiment 106.5 equivalents of talc was stirred into the above prepolymer and salt complex mixture to give a homogeneous mixture or adhesive. Care should be taken to keep the temperature below about 40° C. The adhesive was stored in an airtight container until used. After six months storage the above adhesive was still fluid and could be readily spread on a surface of a polyester fiberglass prepreg test specimen. Two test strips or specimens coated with the adhesive were placed in the usual test cross position and heated at 140° C. for five minutes to cure or set the adhesive between the specimens. Then the cured cross test specimens were subjected to a pull test and the results were comparable to that obtained with Goodyear's commercial two component isocyanate type adhesive.

EXAMPLE 2

A one component adhesive was prepared as in Example 1 except the prepolymer contained 8 percent free NCO and 1 percent by weight of adipic acid, as a cure catalyst, was added prior to the formation of the prepolymer.

Then the adhesive was made by mixing the prepolymer and sodium chloride complex of 4,4'-diphenyl methane diamine at an amine level of 1. This adhesive had excellent shelf storage and could be cured at a lower temperature with 114° C. being found to be a preferred temperature. Therefore this embodiment would be desired where thick or large sections are to be laminated.

EXAMPLE 3

A 50/50 mol percent mixture of ethylene glycol and polytetramethylene ether glycol of about 1000 to 2000 molecular weight was extended with 0.5 equivalents of a toluene diisocyanate mixture per equivalent of the glycols to form a prepolymer. This prepolymer was reacted with sufficient of a 50 percent polymeric polyisocyanate mixture of Mobay's Mondar MRS and Mondar E 451 to give a modified prepolymer having from 5 to 8 percent free NCO. This modified prepolymer was mixed with sufficient du Pont trademark product Caytur 22 to give an amine blend of 1.04 and an adhesive having good shelf life.

Polyester fiberglass (2.54 cm×7.62 cm) samples (FRP) were coated with the adhesive and typical cross laminates formed by pressing the two specimens together. The cross specimens were cured for 20 minutes at 140° C. and then pulled apart at the rate of 0.5 cm per minute.

The results of these pull tests at 0, 1 and 5 days aging respectively showed the bond failure was due to failure of the FRP rather than the adhesive.

In general at the amine level or ratio of amine to excess free NCO in the prepolymer of 0.95 to 1.05 there was relatively little noticeable effect on adhesive bond or pull strength.

Generally the use of a small to 30 percent filler amount could be tolerated except more filler tended to reduce the elongation but promoted heat transfer and shorter curing time as well as improved adhesive strength.

The liquid polyols of 2 to 3 hydroxyls useful in this invention are characterized by being a liquid at 60° C. Also, they are further characterized by exhibiting a solubility at 80° C. of at least 0.13 or greater for the complex of sodium as measured by the following test in said liquid.

SOLUBILITY TEST

Three hundred grams of liquid polyol in a 400 milliliter beaker was heated to 80° C. with stirring on a hot plate. Then a 50/50 mixture of sodium chloride-4,4'-diphenylene methane diamine complex and tetraethylene glycol di(2-ethylhexoate), i.e. Caytur 22, was added dropwise to the mixture until the solution became cloudy. The amount of material added was determined. This point was taken as the solubility point of the salt complex in the polyol.

Table I shows solubility of Caytur 22 in various polyols and it was observed that those liquid polyols having a solubility greater than 0.13 gram yield storage stable liquid adhesive compositions. Generally these polyols have from 2 to 5 hydroxyls and exhibit the ability to dissolve at 80° C. more than 0.13 gram of a 50/50 mixture of sodium chloride-4,4'-diphenylene diamine complex and tetraethylene di(2-ethyl hexoate) in 100 grams of liquid material.

TABLE I

| | Molecular Weight Gm/Mole | Solubility (Caytur 22/100 Gm of polyol) |
|---|---|---|
| Polypropylene glycol ether | 1000 | 0.13 gm |
| Poly(ethylene glycol/tetramethylene glycol) ether | 1000 | 0.16 |
| Polypropylene glycol adipate | 2000 | 0.28 |
| Polytetramethylene glycol ether | 670 | 0.35 |

In addition to the representative polyether polyols of Table I, it should be noted the following liquid, representative polyesters of Table II can be used to make prepolymers that can be mixed with the amine salt complex, preferably at temperatures below 10° C. to give storage stable adhesives.

TABLE II

Poly ethylene glycol adipate
Poly propylene glycol adipate
Poly propylene glycol azelate
Poly hexamethylene glycol isophthalate azelate
Poly hexamethylene glycol orthophthalate
Poly caprolactone Any mixed esters of ether glycols or acids that are liquid at room temperature would have a high enough dielectric constant to be used in this invention. It is indeed amazing to learn this adhesive gives good bonds on low profile FRP strips without use of a primer such as triamines or polyisocyanates.

It should be appreciated other carriers for the metal chloride diamine complex can be utilized such as the plasticizers, for example those exemplified by dialkyl phthalates of about 6 to 10 and preferably 8 carbon atoms per alkyl group or tetraethylene glycol or di(2-ethyl) pentoate.

While certain representative embodiments and details have been shown for the purpose of illustrating the invention it will be apparent those skilled in this art that various changes and modifications may be made therein without departing from the spirit or scope of the invention.

I claim:

1. A storable liquid polyurethane composition comprising an equivalent of a prepolymer formed by reacting a liquid material having 2 to 5 hydroxyls and characterized by the ability to dissolve at 80° C. more than 0.13 gram of a 50/50 mixture of sodium chloride-4,4'-diphenylene diamine complex and tetraethylene di(2-ethyl hexoate) in 100 grams of said liquid material with sufficient organic polyisocyanate to give an excess of 3 to 15 percent free NCO in said prepolymer, said organic polyisocyanate being selected from the class consisting of methane di(phenyl isocyanate) and a mixture of a toluene diisocyanate and a polyaryl methane polyisocyanate with 0.85 to 1.15 equivalents of a complex of an alkali metal salt with 4,4'-diphenylmethane diamine, said alkali metal being selected from the class consisting of sodium, potassium and lithium.

2. The composition of claim 1 containing a small amount to 50 parts of silicate filler per hundred parts of the polyurethane composition.

3. The composition of claim 1 wherein at least 1 part and up to about 50 parts of talc or silicate filler is present for each 100 parts of said composition.

4. The composition of claim 1 wherein the liquid material is a copolymer of ethylene glycol and tetramethylene ether glycol having a molecular weight of about 1000 to 2500.

5. A storable liquid polyurethane adhesive composition capable of adhering two low profile fiberglass strips to yield a bond in excess of 42.1860 kilograms per square meter and comprising a mixture of a prepolymer having 3 to 15 mol percent of free NCO and 0.85 to 1.15 equivalents based on free NCO of said prepolymer with a complex of an alkali metal salt with 4,4'-diphenylmethane diamine, said salt being selected from the class consisting of sodium salts and potassium salts, said prepolymer being a reaction product of an organic polyisocyanate with a liquid polyol having 2 to 3 hydroxyls and exhibiting an ability to dissolve at 80° C. more 0.13 gram of a 50/50 mixture of said complex of the sodium salt and tetraethylene di(2-ethyl hexoate) in 100 grams of said polyol.

6. The adhesive of claim 5 wherein the prepolymer and the complex are mixed at a temperature less than about 10° C.

7. The composition of claim 1 containing a catalytic amount of an organic acidic compound to effect cure at a lower temperature than obtainable without said organic acidic compound.

8. The composition of claim 7 wherein the organic acidic compound is an aliphatic dicarboxylic acid of about 4 to 10 carbon atoms.

9. The adhesive of claim 5 wherein the polyol has two hydroxyls.

10. The adhesive of claim 9 wherein the polyol is a glycol.

* * * * *